United States Patent
Shen et al.

(10) Patent No.: US 11,937,252 B2
(45) Date of Patent: Mar. 19, 2024

(54) METHOD FOR ACTIVATING BANDWIDTH PART, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jia Shen, Guangdong (CN); Yanan Lin, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 628 days.

(21) Appl. No.: 17/123,064

(22) Filed: Dec. 15, 2020

(65) Prior Publication Data
US 2021/0105756 A1    Apr. 8, 2021

Related U.S. Application Data

(63) Continuation of application No. PCT/CN2018/093241, filed on Jun. 28, 2018.

(51) Int. Cl.
*H04W 72/23*    (2023.01)
*H04W 76/27*    (2018.01)

(52) U.S. Cl.
CPC ........... *H04W 72/23* (2023.01); *H04W 76/27* (2018.02)

(58) Field of Classification Search
CPC ..... H04W 72/23; H04W 76/27; H04W 76/15; H04W 72/0453; H04L 5/001; H04L 5/0053; H04L 5/0098; H04L 5/0007; Y02D 30/70
See application file for complete search history.

(56) References Cited

U.S. PATENT DOCUMENTS

2019/0132824 A1*  5/2019  Jeon .................... H04L 5/00
2019/0357238 A1*  11/2019 Zhou .................. H04W 72/23
(Continued)

FOREIGN PATENT DOCUMENTS

CN    108012329 A    5/2018
CN    108135028 A    6/2018
(Continued)

OTHER PUBLICATIONS

3GPP TSG RAN WG1 NR Ad Hoc Meeting; R1-1800018; Source: Huawei, HiSilicon; Title: Remaining issues on bandwidth part and wideband operation, Vancouver, Canada, Jan. 22-26, 2018. (Year: 2018).*

(Continued)

*Primary Examiner* — Mohammed S Chowdhury
(74) *Attorney, Agent, or Firm* — PERKINS COIE LLP

(57) ABSTRACT

Embodiments of the present application relate to a method for activating a Bandwidth Part (BWP), a terminal device, and a network device. The method comprises: the terminal device receives second Downlink Control Information (DCI) sent by the network device, wherein a first BWP of the terminal device is in an activated state, the second DCI is scrambled by adopting a second Radio Network Temporary Identifier (RNTI), the second DCI is used for indicating a second BWP, and the first BWP is not activated by the second DCI; the terminal device maintains the activated state of the first BWP and activates the second BWP. According to the method for activating the BWP, the terminal device, and the network device of the embodiments of the present application, service richness and service capability of a 5G terminal can be increased sharply.

26 Claims, 7 Drawing Sheets

(56) References Cited

U.S. PATENT DOCUMENTS

| | | | | |
|---|---|---|---|---|
| 2019/0357262 A1* | 11/2019 | Cirik | ...................... | H04W 76/27 |
| 2019/0357300 A1* | 11/2019 | Zhou | ...................... | H04L 5/0053 |
| 2020/0351851 A1* | 11/2020 | Aiba | ...................... | H04W 72/23 |
| 2021/0119745 A1* | 4/2021 | Li | ......................... | H04L 5/0042 |

FOREIGN PATENT DOCUMENTS

| | | |
|---|---|---|
| WO | 2013174167 A1 | 11/2013 |
| WO | 2018103558 A1 | 6/2018 |

OTHER PUBLICATIONS

3GPP TSG RAN WG1 Meeting #92; R1-1801347; Source: Huawei, HiSilicon; Title: Summary of remaining issues on bandwidth part and wideband operation; Athens, Greece, Feb. 26-Mar. 2, 2018 (Year: 2018).*
3GPP TSG RAN WG1 Meeting #92; R1-1801638; Source: MediaTek Inc.; Title: Remaining Details on Bandwidth Part Operation in NR; Athens, Greece, Feb. 26-Mar. 2, 2018. (Year: 2018).*
EPO, Extended European Search Report for European Patent Application No. 18924268.8, dated Jun. 4, 2021. 10 pages.
Ericsson "Summary of 7.1.3.1.4 (DCI contents and formats)" R1-1805572; TSG-RAN WG1 #92bis; Apr. 16-20, 2018. 18 pages.
MediaTek Inc. "Remaining Details on Bandwidth Part Operation in NR" R1-1718327; 3GPP TSG RAN WG1 Meeting 90bis; Oct. 9-13, 2017. 13 pages.
International Search Report dated Mar. 29, 2019 of PCT/CN2018/093241 (4 pages).

* cited by examiner

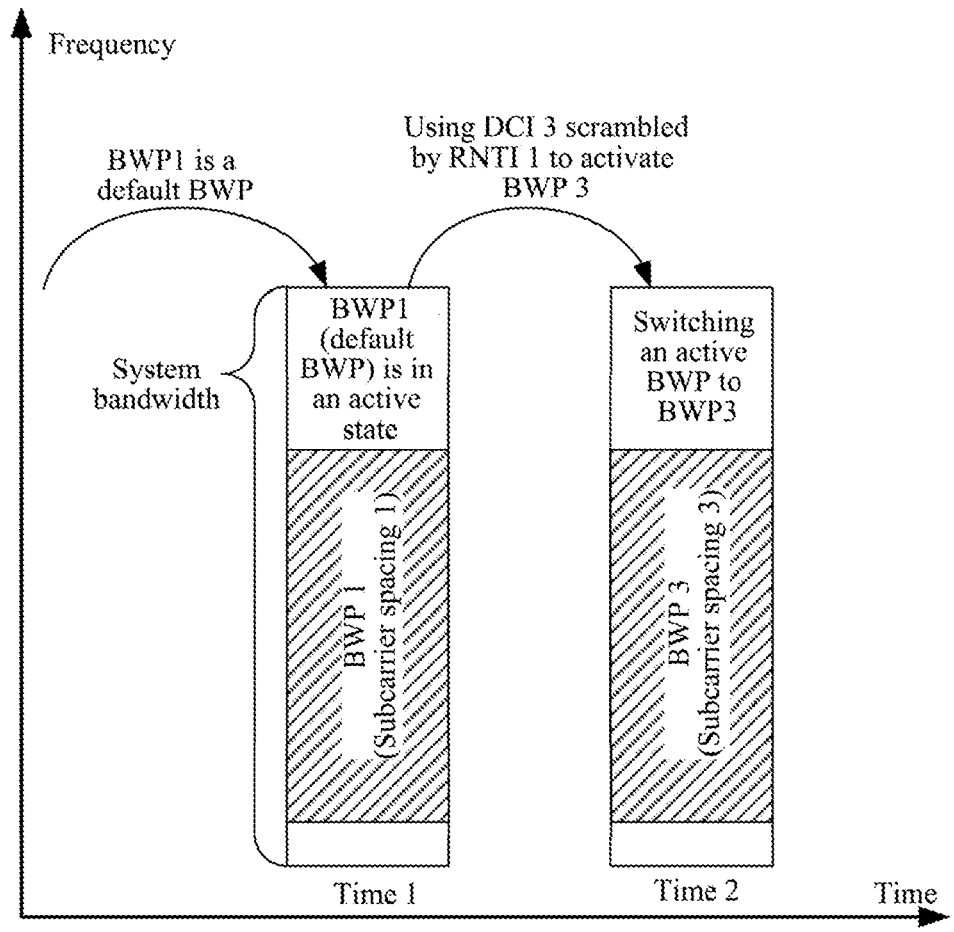

Sending, by a network device, second DCI to a terminal device, a first BWP of the terminal device is in an active state, the second DCI is scrambled by a second RNTI, the second DCI is used for indicating a second BWP, the first BWP is not activated by the second DCI, and the second DCI is used by the terminal device to maintain the active state of the first BWP and to activate the second BWP ⸺ S310

FIG. 8

METHOD FOR ACTIVATING BANDWIDTH PART, TERMINAL DEVICE, AND NETWORK DEVICE

CROSS-REFERENCE TO RELATED APPLICATION

This application is a continuation application of International Application No. PCT/CN2018/093241, filed on Jun. 28, 2018, the entire disclosure of which is hereby incorporated by reference.

TECHNICAL FIELD

The present application relates to a field of communication, in particular to a method for activating a bandwidth part, a terminal device and a network device.

BACKGROUND

In a Long Term Evolution (LTE) system, a working bandwidth and a subcarrier spacing of the terminal device are both single. The working bandwidth is equal to a system bandwidth of a cell, and the subcarrier spacing is equal to 15 kHz. Therefore, the terminal device may only support Mobile Broadband (MBB) services, and it is difficult to effectively support low-latency services, such as Ultra Reliable & Low Latency Communication (URLLC) services.

An application scenario of the URLLC is introduced into a 5G New Radio (NR) standard, and a variety of Numerologies are introduced, including subcarrier spacings such as 15 kHz, 30 kHz, 60 kHz, 120 kHz and 240 kHz, etc. A small subcarrier spacing is more suitable for transmitting ordinary Enhance Mobile Broadband (eMBB) services because of its high frequency spectrum efficiency, and a large subcarrier spacing is more suitable for achieving lower latency services (such as URLLC services). At the same time, a Bandwidth Part (BWP) is also introduced in the 5G NR standard. A BWP may only cover a part of the system bandwidth and only corresponds to a certain Numerology.

A base station may configure multiple BWPs for the terminal device through Radio Resource Control (RRC) signaling, and then dynamically activates a certain BWP in Downlink Control Information (DCI). Each BWP is based on a Numerology.

According to a current solution, only one BWP may be activated for one terminal device. When a new BWP is activated, an original BWP is deactivated. Because BWP switch needs a certain transition period, which may reach hundreds of microseconds to several milliseconds. In the transition period of the BWP switch, both the original BWP and the new BWP may not be used.

Therefore, based on the current solution, it is impossible to achieve a fast switch between two Numerologies, thus unable to support an simultaneous operation or a fast switch between an ordinary eMBB service and the URLLC service, and unable to effectively support the operation of these two services on one terminal device, which greatly limits service richness and service capability of the 5G terminal device.

SUMMARY

Implementations of the present application provide a method for activating a bandwidth part, a terminal device and a network device.

In a first aspect, there is provided a method for activating a bandwidth part, including: receiving, by a terminal device, second downlink control information (DCI) sent by a network device, and a first BWP of the terminal device is in an active state, the second DCI is scrambled by a second radio network temporary identifier (RNTI), the second DCI is used for indicating the second BWP, and the first BWP is not activated by the second DCI; and maintaining, by the terminal device, the active state of the first BWP, and activating the second BWP.

In a second aspect, there is provided a method for activating a bandwidth part, including: sending, by a network device, second downlink control information (DCI) to a terminal device, and a first BWP of the terminal device is in an active state, the second DCI is scrambled by a second radio network temporary identifier (RNTI), the second DCI is used for indicating the second BWP, the first BWP is not activated by the second DCI, and the second DCI is used by the terminal device to maintain the active state of the first BWP and activate the second BWP.

In a third aspect, there is provided a terminal device, for executing the method in above first aspect or various implementations thereof.

Specifically, the terminal device includes functional modules for executing the method in the above first aspect or various implementations thereof.

In a fourth aspect, there is provided a network device, for executing the method in the second aspect or various implementations thereof.

Specifically, the network device includes functional modules for executing the method in the above second aspect or various implementations thereof.

In a fifth aspect, there is provided a terminal device, including a processor and a memory. The memory is configured to store a computer program, and the processor is configured to call and run the computer program stored in the memory to execute the method in the first aspect or various implementations thereof.

In a sixth aspect, there is provided a network device including a processor and a memory. The memory is configured to store a computer program, and the processor is configured to call and run the computer program stored in the memory to execute the method in the second aspect or various implementations thereof.

In a seventh aspect, there is provided a chip configured to implement any one of the above first to second aspects or the method in various implementations thereof.

Specifically, the chip includes a processor configured to call and run a computer program from a memory, causing the device on which the chip is installed to execute the method in any one of the above first to second aspects or in various implementations thereof.

In an eighth aspect, there is provided a computer-readable memory medium configured to store a computer program, wherein the computer program enables a computer to execute the method in any one of the above first to second aspects or various implementations thereof.

In a ninth aspect, there is provided a computer program product including computer program instructions, wherein the computer program instructions enable a computer to execute the method in any one of the above first to second aspects or in various implementations thereof.

In a tenth aspect, there is provided a computer program which, when run on a computer, enables the computer to execute any one of the above first to second aspects or the method in various implementations thereof.

With the above technical scheme, the terminal device may respectively activate one BWP according to DCIs scrambled by two RNTIs, so that two BWPs are in active states at the same time, thereby supporting one terminal to simultaneously run different types of services based on two Numerologies, thus effectively supporting a 5G terminal to simultaneously run eMBB and URLLC services. Present implementation is mainly applicable to scenarios after RRC connection is established.

BRIEF DESCRIPTION OF DRAWINGS

FIG. 7 is another schematic diagram of modifying an active BWP provided by an implementation of the present application.

FIG. 8 is another schematic flow chart of a method for activating BWP provided by an implementation of the present application.

DETAILED DESCRIPTION

Technical solutions in implementations of the present application will be described below in combination with drawings in the implementations of the present application. It is apparent that the implementations described are a part of the implementations of the present application, but not all the implementations of the present application. Based on the implementations of the present application, all other implementations achieved by an ordinary skilled in the art without paying inventive efforts are within a protection scope of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc..

Figure 1:
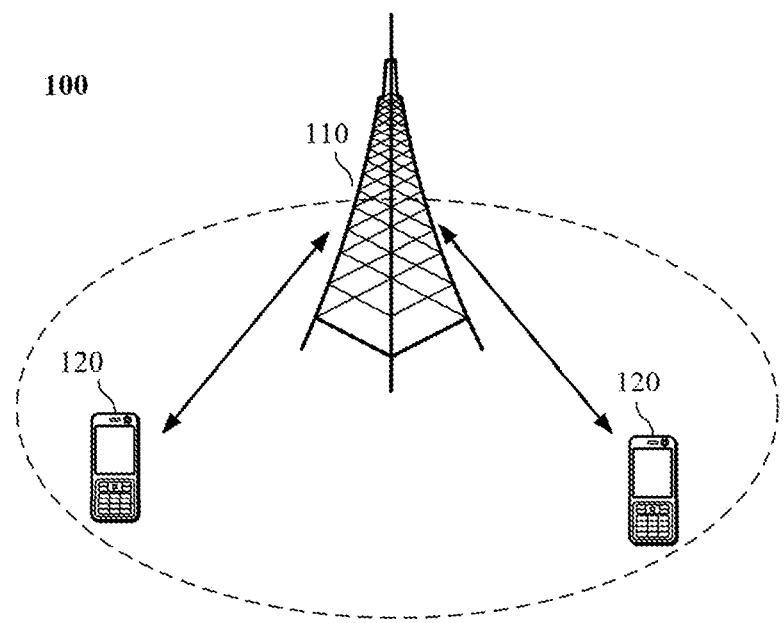
FIG. 1 is a schematic diagram of an architecture of a communication system provided by an implementation of the present application.

Illustratively, a communication system 100 applied in an implementation of the present application is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with the terminal device located within the coverage area. Alternatively, the network device 110 may be a Base Transceiver Station (BTS) in a GSM system or a CDMA system, a base station (NodeB, NB) in a WCDMA system, an Evolutional base station (Evolutional Node B, eNB or eNodeB) in a LTE system, or a radio controller in a Cloud Radio Access Network (CRAN). Or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As the "terminal device" used herein, it includes, but is not limited to, an apparatus configured to connect via a wired circuit, for example, via a Public Switched Telephone Network (PSTN), a Digital Subscriber Line (DSL), a digital cable, a direct cable; and/or another data connection/network; and/or via a wireless interface, for example, for a cellular network, a Wireless Local Area Network (WLAN), a digital television network such as a Digital Video Broadcasting-Handheld (DVB-H) network, a satellite network, and an AM-FM broadcast transmitter; and/or an apparatus of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communication System (PCS) terminal which may combine a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatuses including a radio telephone transceiver. The terminal device may be referred to as an access terminal, a User Equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

Alternatively, Device to Device (D2D) communication may be performed between the terminal devices 120.

Alternatively, the 5G system or the 5G network also may be referred to as a New Radio (NR) system or a NR network.

FIG. 1 illustratively shows one network device and two terminal devices. Alternatively, the communication system 100 may include multiple network devices, and another quantity of terminal devices may be included within the coverage area of each network device. The implementations of the present application are not limited to this.

Alternatively, the communication system 100 also may include other network entities such as a network controller, and a mobile management entity. The implementations of the present application are not limited to this.

It should be understood that, a device with a communication function in a network/system in the implementation of the present application may be referred to as a communication device. Take the communication system 100 shown in FIG. 1 as an example, the communication device may include a network device 110 and a terminal device 120 which have communication functions, and the network device 110 and the terminal device 120 may be specific devices described above, which will not be described here again. The communication device may also include other devices in the communication system 100, such as other network entities including a network controller, a mobile management entity, etc.. The implementations of the present application are not limited to this.

It should be understood that terms "system" and "network" are often used interchangeably in this description. The term "and/or" in this description is merely an association relationship describing associated objects, indicating that there may be three relationships, for example, A and/or B may indicate these three cases: A alone, A and B, and B alone. In addition, a symbol "I" in this description generally indicates that associated objects before and after the symbol "/" have an "or" relationship.

In the 5G NR system, a BWP is introduced. One BWP may only cover a part of a system bandwidth and only corresponds to a certain Numerology. The network device may configure multiple BWPs for each terminal device through RRC signaling, and then dynamically activate a certain BWP in a DCI. Each BWP is based on a Numerology (including subcarrier spacing and cyclic prefix CP). According to a current scheme, only one BWP may be activated for a terminal device. When a new BWP is activated, an original BWP is deactivated.

Figure 2:
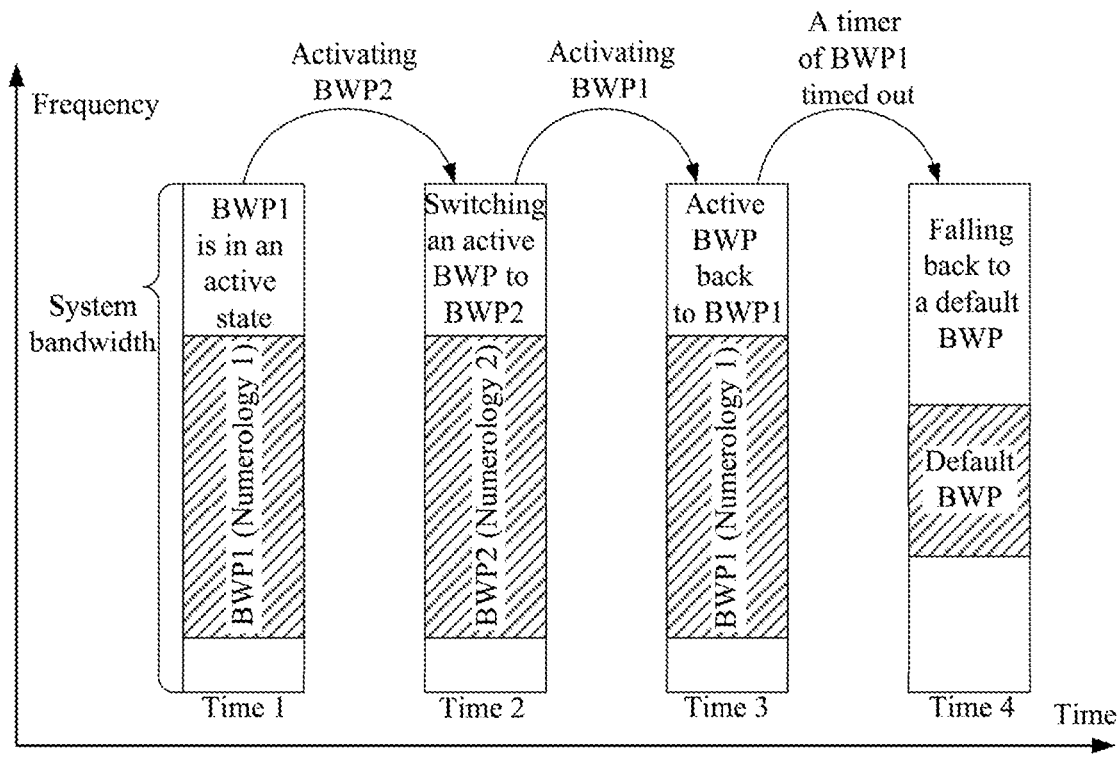
FIG. 2 is a schematic diagram of activating a BWP provided by an implementation of the present application.

Specifically, FIG. 2 is a schematic diagram of a method for activating a BWP provided by an implementation of the present application. As shown in FIG. 2, for any terminal device, if BWP 2 needs to be activated when BWP 1 is in an active state, BWP 1 will be deactivated, that is, the active BWP of the terminal device will be changed from BWP 1 to BWP 2. Similarly, the active BWP of terminal device also may be changed from BWP 2 to BWP 1. When BWP 1 is the active BWP of the terminal device and the BWP 1 is deactivated, it will fall back to a default BWP.

Because a BWP switch needs a certain transition period, which may reach hundreds of microseconds to several milliseconds. In the transition period of the BWP switch, both the original BWP and a new BWP may not be used. Therefore, based on an existing solution, it is impossible to achieve a fast switch between two Numerologies, thus it is impossible to support simultaneous operations or the fast switch between an ordinary eMBB service and a URLLC service, and it is also impossible to effectively support running these two services on one terminal device, which greatly limits service richness and service capability of a 5G terminal. Therefore, a method for activating the BWP is proposed in the implementation of the present application, which enables two BWPs to be in the active state at the same time, thus supporting one terminal device to run different types of services based on two Numerologies at the same time, thus effectively supporting the 5G terminal to run the eMBB service and the URLLC service at the same time, and greatly improving the service richness and the service capability of the 5G terminal.

Figure 3:
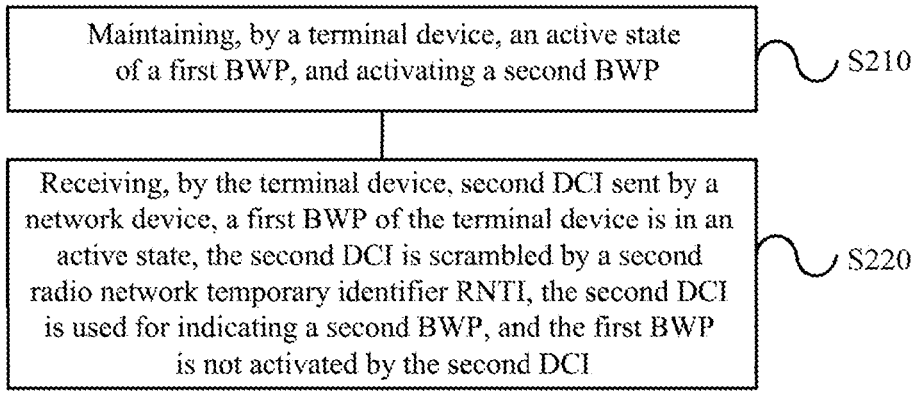
FIG. 3 is a schematic diagram of a method for activating a BWP provided by an implementation of the present application.

FIG. 3 shows a schematic flow chart of a method 200 for activating a BWP according to an implementation of the present application, and the method 200 may be performed by a terminal device. As shown in FIG. 3, the method 200 includes: S210, receiving, by the terminal device, second DCI sent by a network device, wherein a first BWP of the terminal device is in an active state, the second DCI is scrambled by a second radio network temporary identifier (RNTI), the second DCI is used for indicating a second BWP, and the first BWP is not activated by the second DCI; S220, maintaining, by the terminal device, the active state of the first BWP, and activating the second BWP.

In the implementation of the present application, before receiving, by the terminal device, the second DCI sent by the network device, the method 100 further includes: receiving, by the terminal device, third configuration information sent by the network device; and according to the third configuration information, determining, by the terminal device, that the DCI scrambled by the second RNTI needs to be monitored, thereby facilitating the terminal device to monitor and receive the second DCI scrambled by the second RNTI according to the third configuration information.

The third configuration information may be RRC configuration information. If the third configuration information includes a first value, the terminal device determines that the DCI scrambled by the second RNTI needs to be monitored. If the third configuration information includes a second value, the terminal device determines that the DCI scrambled by the second RNTI does not need to be monitored. For example, the first value may be 1 and the second value may be 0.

It should be understood that the active BWP of the terminal device is the first BWP, which is not activated by the second DCI. Alternatively, the first BWP may be activated by first DCI scrambled by the first RNTI, which is different from the second RNTI. Or, the first BWP may be a default BWP, an initial active BWP or a first active BWP configured through the RRC.

Alternatively, the first RNTI may be a Cell Radio Network Temporary Identify (C-RNTI), and correspondingly, the second RNTI is other RNTIs except the C-RNTI. Or, the second RNTI is the C-RNTI, and correspondingly, the first RNTI is other RNTIs except the C-RNTI. The implementations of the present application are not limited to this.

In the implementation of the present application, if the first BWP and the second BWP are different, corresponding Numerology of the first WBP and corresponding Numerology of the second WBP are different. The Numerology may include at least one parameter, for example, the Numerology may include a subcarrier spacing, also may include cyclic prefix (CP) type. For example, the CP type includes normal CP and extended CP. But the implementations of the present application are not limited to this.

Alternatively, as an implementation, as shown in FIG. 3, the terminal device activates BWP 1 through DCI 1 scrambled by RNTI 1, so that the BWP 1 is in the active state. Then, if the network device activates BWP 2 through DCI 2 scrambled by RNTI 2, the terminal device also activates the BWP 2, so that the BWP 1 and the BWP 2 are in the active state at the same time. The BWP 1 and the BWP 2 may have different subcarrier spacings.

Figure 4:
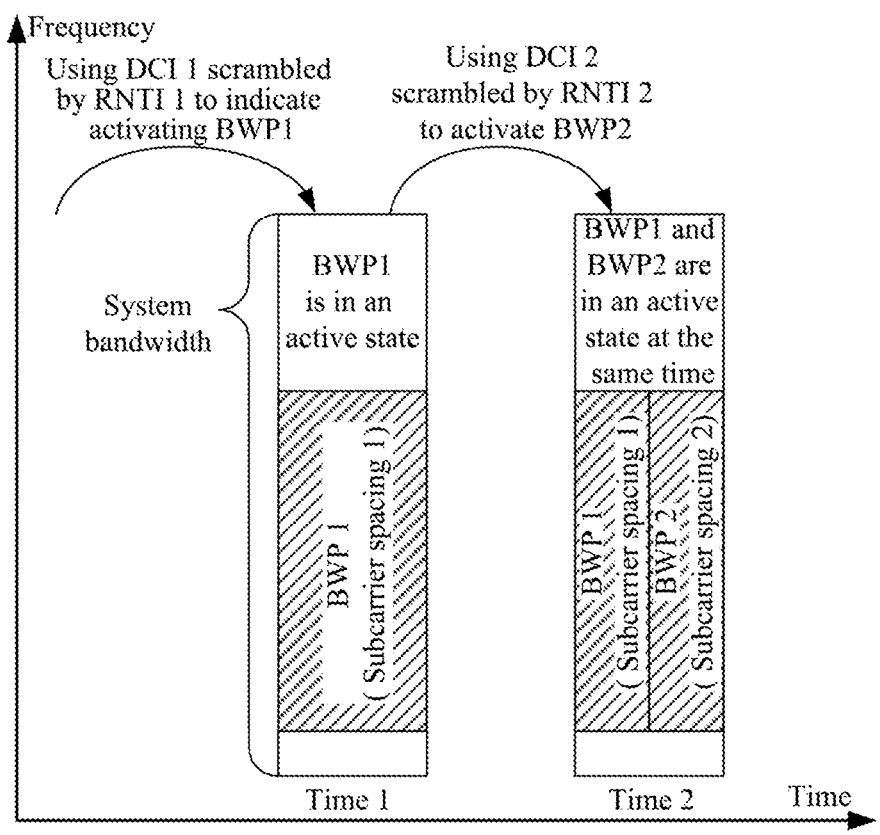
FIG. 4 is a schematic diagram of simultaneously activating two BWPs provided by an implementation of the present application.

Alternatively, as another implementation, as shown in FIG. 4, the BWP in the active state of the terminal device is the BWP 1, which is the Default BWP or the initial active BWP or the first active BWP configured through the RRC. For example, the BWP 1 in FIG. 4 is the Default BWP. Then, if the network device activates the BWP 2 through the DCI 2 scrambled by the RNTI 2, for example, the RNTI may be an RNTI except the C-RNTI, the terminal device also activates the BWP 2, so that the BWP 1 and the BWP 2 are in an active state at the same time. The BWP 1 and the BWP 2 may have different subcarrier spacings.

In the implementation of the present application, the method 200 further includes: receiving, by the terminal device, third DCI sent by the network device, wherein the first BWP of the terminal device is in an active state, the third DCI is scrambled by the first RNTI, and the third DCI is used for indicating a third BWP; and modifying, by the terminal device, the active BWP from the first BWP to the third BWP.

Alternatively, as an implementation, the active BWP of the terminal device is the first BWP, which may be activated by the first DCI scrambled by the first RNTI. When the terminal device receives the third DCI likewise scrambled by the first RNTI and the third DCI indicates the third BWP, the terminal device modifies the active BWP from the first BWP to the third BWP.

Figure 5:
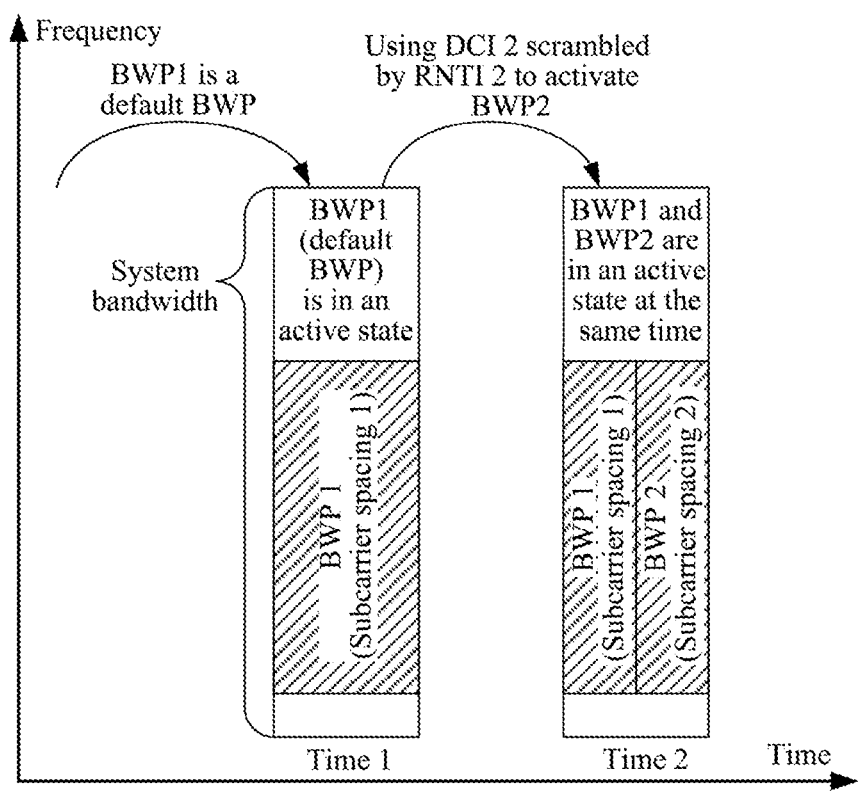
FIG. 5 is another schematic diagram of simultaneously activating two BWPs provided by an implementation of the present application.

For example, as shown in FIG. 5, the terminal device activates the BWP 1 through the DCI 1 scrambled by the RNTI 1, causing the BWP 1 is in an active state. Then, if the network device uses DCI 3 scrambled by the RNTI 1 to activate BWP 3, the BWP 3 replaces the BWP 1 as the active BWP, that is, the active BWP of the terminal device is modified from the BWP 1 to the BWP 3. The BWP 1 and the BWP 3 may have different subcarrier spacings.

Alternatively, as another implementation, the active BWP of the terminal device is the first BWP, which may be the default BWP, the initial active BWP or the first active BWP. Here, take the initial active BWP as an example, that is, the first BWP is the initial active BWP. When the terminal device receives the third DCI scrambled by the first RNTI, for example, the first RNTI may be a C-RNTI and the third DCI indicates a third BWP, the terminal device may modify the active BWP from the initial active BWP to the third BWP.

Figure 6:
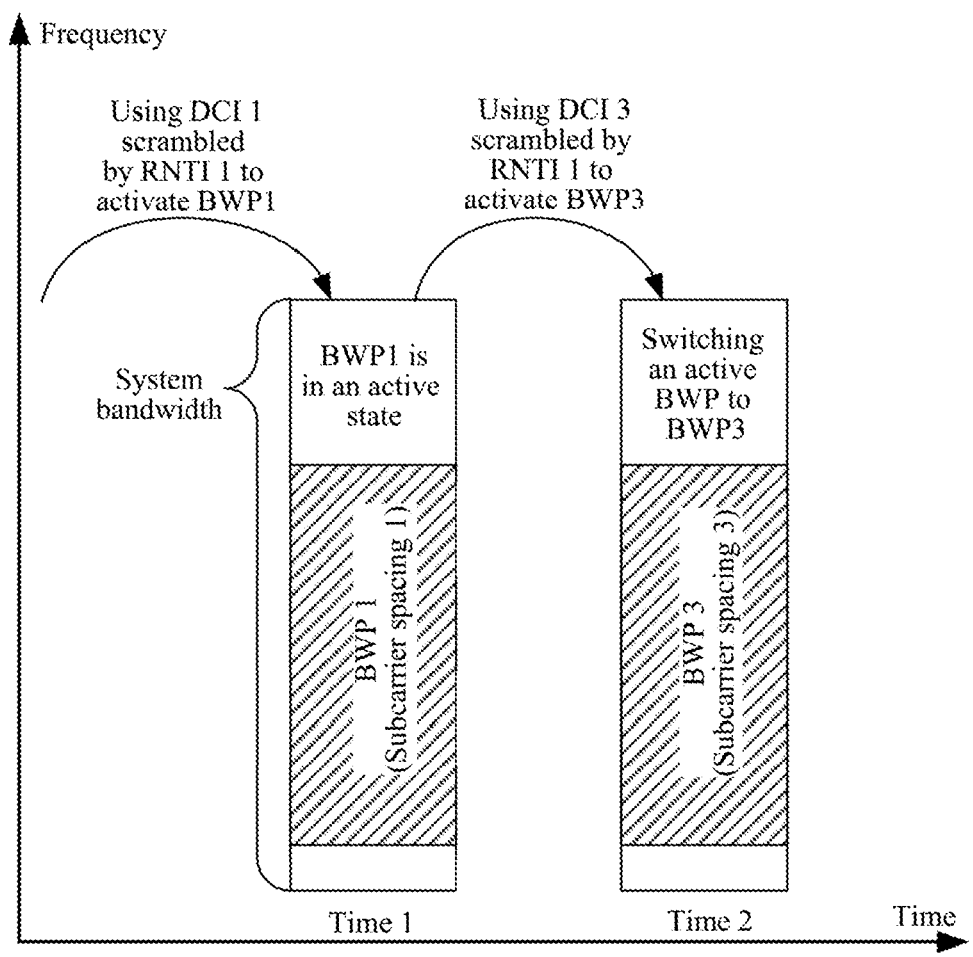
FIG. 6 is a schematic diagram of modifying an active BWP provided by an implementation of the present application.

For example, as shown in FIG. 6, the BWP in the active state of the terminal device is BWP 1, which is the Default BWP, the initial active BWP or the first active BWP configured by the RRC, for example, the BWP 1 in FIG. 6 is the Default BWP. Then, if the network device uses the DCI 3 scrambled by the RNTI 1 to activate the BWP 3, the BWP 3 replaces the BWP 1 as the active BWP, that is, the active BWP of the terminal device is modified from the Default BWP to the BWP 3. The BWP 1 and the BWP 3 may have different subcarrier spacings.

In the implementation of the present application, the terminal device receives the second DCI sent by the network device, which is used for indicating the second BWP. Alternatively, the second DCI may include configuration parameters of the second BWP, so that the terminal device may determine the second BWP and the configuration parameters of the second BWP according to the second DCI. Or, the second DCI may include an indicator of the second BWP, and the terminal device determines the configuration parameter corresponding to the indicator of the second DCI according to the indicator of the second BWP in the second DCI and the corresponding relationship between the indicator of the BWP and the configuration parameter.

Alternatively, as an implementation, the second DCI includes configuration parameters of the second BWP, which may include at least one of the following parameters: a subcarrier spacing of the second BWP, cyclic prefix type of the second BWP, a number and a frequency domain position of resource blocks included in the second BWP.

Alternatively, as an implementation, the second DCI may include the indicator of the second BWP, and before receiving, by the terminal device, the second DCI sent by the network device, the method 100 further includes: receiving, by the terminal device, the first configuration information sent by the network device. For example, the first configuration information may be RRC configuration information. Specifically, the first configuration information is used for indicating a corresponding relationship between a configuration parameter of at least one BWP and an indicator of the at least one BWP, wherein the at least one BWP includes the second BWP.

The configuration parameter of a fifth BWP among the at least one BWP may include at least one of the following parameters: a subcarrier spacing of the fifth BWP, a cyclic prefix length of the fifth BWP, a number and a frequency domain position of resource blocks included in the fifth BWP, wherein the fifth BWP is any one of the at least one BWP. Then the terminal device, according to a corresponding relationship between the configuration parameter of the at least one BWP in the first configuration information and the indicator of the at least one BWP, determines that the configuration parameter corresponding to the indicator of the second BWP included in the second DCI is the configuration parameter of the second BWP.

Alternatively, as an implementation, the second DCI may include an indicator of the second BWP, and before receiving, by the terminal device, the second DCI sent by the network device, the method 100 further includes: receiving, by the terminal device, second configuration information sent by the network device, for example, the second configuration information may be RRC configuration information, and the second configuration information includes at least one configuration sub-information. Specifically, for any one configuration sub-information of the at least one configuration sub-information, the one configuration sub-information corresponds to a group of BWPs, the group of BWPs corresponds to an RNTI, the group of BWPs includes at least one BWP, and the one configuration sub-information includes a corresponding relationship between the configuration parameter of the at least one BWP and an intra-group number of the at least one BWP.

A configuration parameter of a fifth BWP among at least one BWP included in the group of BWPs may include: the subcarrier spacing of the fifth BWP, the cyclic prefix type of the fifth BWP, the number and the frequency domain position of resource blocks included in the fifth BWP, wherein the fifth BWP is any one BWP of the at least one BWP. Then terminal device receives the second DCI sent by the network device, the second DCI includes the indicator of the second BWP, and the indicator of the second BWP is the intra-group number of the BWP. Since the second DCI is scrambled by the second RNTI, the terminal device determines a group of BWPs corresponding to the second RNTI, and determines that the configuration parameter corresponding to the intra-group number of the second BWP in the group BWPs is the configuration parameter of the second BWP.

In the implementation of the present application, the first BWP, the second BWP and the third BWP may all be uplink BWPs, or they may all be downlink BWPs.

For example, in an FDD system, assuming that both the first BWP and the second BWP are uplink BWPs, the terminal device may activate the first BWP and the second BWP at the same time, without affecting the downlink BWP. Or, assuming that the first BWP and the third BWP are both uplink BWPs, the terminal device modifies the active BWP from the first BWP to the third BWP, without affecting the downlink BWP.

For another example, in a TDD system, assuming that both the first BWP and the third BWP are uplink BWPs, the terminal device modifies the active BWP from the first BWP to the third BWP, that is, deactivates the first BWP. Meanwhile, corresponding to the downlink BWP, the terminal device also may deactivate the first BWP and modify the active BWP from the first BWP to the third BWP. But the implementation of this application is not limited to this.

Therefore, in the method for activating the BWP in the implementation of the present application, the terminal device activates one BWP respectively according to a DCI scrambled by two RNTIs, so that the two BWPs are in the active state at the same time, which may support one terminal to simultaneously run different types of services based on two Numerologies, thereby effectively supporting the 5G terminal to simultaneously run the eMBB service and the URLLC service, and greatly improving the service richness and the service capability of the 5G terminal. The present implementation is mainly applicable to scenarios after RRC connection is established.

The method for activating the BWP according to the implementations of the present application is described in detail above from the perspective of a terminal device in combination with FIG. 3 to FIG. 7. The method for activating the BWP according to the implementation of the present application will be described below from the perspective of a network device in combination with FIG. 8.

FIG. 8 shows a schematic flow chart of a method 300 for activating the BWP according to the implementation of the present application. The method 300 may be performed by the network device, specifically, for example, the network device may be the network device 110 in FIG. 1. As shown in FIG. 8, the method 300 includes: S310, sending, by the network device, second DCI to a terminal device, wherein a first BWP of the terminal device is in an active state, the second DCI is scrambled by a second RNTI, the second DCI is used for indicating a second BWP, the first BWP is not activated by the second DCI, and the second DCI is used by the terminal device to maintain the active state of the first BWP and to activate the second BWP.

Alternatively, before sending, by the network device, the second downlink control information DCI to the terminal device, the method 300 further includes: sending, by the network device, the first DCI to the terminal device, wherein the first DCI is scrambled by a first RNTI, the first RNTI is different from the second RNTI, the first DCI is used for indicating the first BWP, and the first DCI is used for the terminal device to activate the first BWP.

Alternatively, the first BWP is an initial active BWP, a first active BWP or a default BWP.

Alternatively, the method 300 further includes: sending, by the network device, third DCI to the terminal device, wherein the first BWP of the terminal device is in the active state, the third DCI is scrambled by a first RNTI, the first RNTI is different from the second RNTI, the third DCI is used for indicating a third BWP, and the third DCI is used by the terminal device to modify the active BWP from the first BWP to the third BWP.

Alternatively, the first RNTI is a C-RNTI.

Alternatively, subcarrier spacings of the first BWP and the second BWP are different.

Alternatively, the second DCI includes an indicator of the second BWP.

Alternatively, before sending, by the network device, the second downlink control information DCI to the terminal device, the method 300 further includes: sending, by the network device, first configuration information to the terminal device, wherein the first configuration information is used for indicating a corresponding relationship between a configuration parameter of at least one BWP and an indicator of the at least one BWP, the at least one BWP includes the second BWP, a configuration parameter of a fourth BWP among the at least one BWP include at least one of the following parameters: a subcarrier spacing of the fourth BWP, a cyclic prefix type of the fourth BWP, a number and a frequency domain position of resource blocks included in the fourth BWP, and the fourth BWP is any one BWP among the at least one BWP.

Alternatively, the first configuration information is RRC configuration information.

Alternatively, before sending, by the network device, the second downlink control information DCI to the terminal device, the method further includes: sending, by the network device, second configuration information to the terminal device, wherein the second configuration information includes at least one configuration sub-information, the configuration sub-information is used for indicating a corresponding relationship between a configuration parameter of at least one BWP included in a group of BWPs and an intra-group number of the at least one BWP, the group of BWPs corresponds to one RNTI, the configuration parameter of the fifth BWP among the at least one BWP includes: a subcarrier spacing of the fifth BWP, a cyclic prefix type of the fifth BWP, and a number and a frequency domain position of resource blocks included in the fifth BWP, the fifth BWP is any one BWP among the at least one BWP, the indicator of the second BWP included in the second DCI is the intra-group number of the second BWP, and the intra-group number of the second BWP is used by the terminal device to determine the second BWP in a BWP group corresponding to the second RNTI.

Alternatively, the second configuration information is the RRC configuration information.

Alternatively, the second DCI includes the configuration parameter of the second BWP, and the configuration parameter includes at least one of the following parameters: a subcarrier spacing of the second BWP, a cyclic prefix type of the second BWP, a number and a frequency domain position of resource blocks included in the second BWP.

Alternatively, before sending, by the network device, the second downlink control information DCI to the terminal device, the method 300 further includes: sending, by the network device, third configuration information to the terminal device, wherein the third configuration information is used for indicating that the terminal device needs to monitor the DCI scrambled by the second RNTI.

Alternatively, the third configuration information is the RRC configuration information.

Alternatively, the first BWP and the second BWP are uplink BWPs, or the first BWP and the second BWP are downlink BWPs.

Therefore, in the method for activating BWP in the implementation of this application, the network device sends DCIs scrambled by two RNTIs to the terminal device, respectively indicating to activate one BWP, so that the two BWPs of the terminal device are in the active state at the same time, thus supporting one terminal to simultaneously run different types of services based on two Numerologies, thus effectively supporting the 5G terminal to simultaneously run an eMBB service and a URLLC service, and greatly improving service richness and service capability of the 5G terminal. This implementation is mainly applicable to scenarios after an RRC connection is established.

It should be understood that in various implementations of the present application, values of sequence numbers of above various processes do not imply a priority of an execution order of the various processes, wherein the execution order of the various processes should be determined by their functions and internal logics, and should not constitute any limitation on implementation processes of the implementation of the present application.

In addition, the term "and/or" in this specification describes only an association relationship for describing associated objects and represents that three relationships may exist. For example, A and/or B may represent the following three cases: Only A exists, both A and B exist, and only B exists. In addition, the symbol "/" in this document generally indicates that objects before and after the symbol "/" have an "or" relationship.

The method for activating the BWP according to the implementation of the present application is described in detail above in combination with FIG. 1 to FIG. 8. A terminal device and a network device according to the implementation of the present application will be described below in combination with FIG. 9 to FIG. 13.

Figure 9:
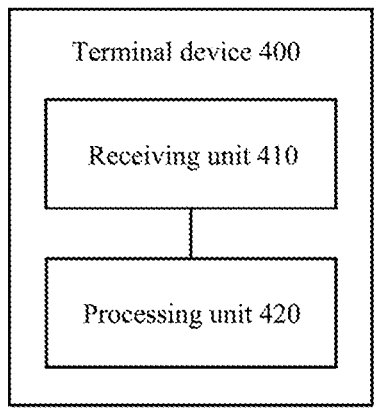
FIG. 9 is a schematic block diagram of a terminal device provided by an implementation of this application.

As shown in FIG. 9, the terminal device 400 according to the implementation of the present application includes a receiving unit 410 and a processing unit 420. Specifically, the receiving unit 410 is configured to receive second downlink control information DCI sent by a network device, wherein a first BWP of the terminal device is in an active state, the second DCI is scrambled by a second radio network temporary identifier RNTI, the second DCI is used for indicating a second BWP, the first BWP is not activated by the second DCI; and the processing unit 420 is configured to maintain the active state of the first BWP and activate the second BWP.

Alternatively, the receiving unit 410 is further configured to receive the first DCI sent by the network device before receiving the second DCI sent by the network device, wherein the first DCI is scrambled by a first RNTI, the first RNTI is different from the second RNTI, and the first DCI is used to indicate the first BWP; and the processing unit 420 is further configured to activate the first BWP according to the first DCI.

Alternatively, the first BWP is an initial active BWP, a first active BWP or a default BWP.

Alternatively, the receiving unit 410 is further configured to receive third DCI sent by the network device, wherein the first BWP of the terminal device is in the active state, the third DCI is scrambled by the first RNTI, the first RNTI is different from the second RNTI, and the third DCI is used for indicating a third BWP; and the processing unit 420 is further configured to modify the active BWP from the first BWP to the third BWP.

Alternatively, the first RNTI is a cell radio network temporary identifier C-RNTI.

Alternatively, subcarrier spacings of the first BWP and the second BWP are different.

Alternatively, the second DCI includes an indicator of the second BWP.

Alternatively, the receiving unit 410 is further configured to receive first configuration information sent by the network device before receiving the second DCI sent by the network device, wherein the first configuration information is used for indicating a corresponding relationship between a configuration parameter of at least one BWP and an indicator of the at least one BWP, the at least one BWP includes the second BWP, a configuration parameter of a fourth BWP among the at least one BWP include at least one of following parameters: subcarrier spacing of the fourth BWP, cyclic prefix type of the fourth BWP, and a number and a frequency domain position of resource blocks included in the fourth BWP, and the fourth BWP is any one BWP among the at least one BWP.

Alternatively, the first configuration information is RRC configuration information.

Alternatively, the receiving unit 410 is further configured to receive second configuration information sent by the network device before receiving the second DCI sent by the network device, wherein the second configuration information includes at least one configuration sub-information, the configuration sub-information is used for indicating a corresponding relationship between a configuration parameter of at least one BWP included in a group of BWPs and an intra-group number of the at least one BWP, the group of BWPs corresponds to one RNTI, a configuration parameter of a fifth BWP among the at least one BWP includes: a subcarrier spacing of the fifth BWP, a cyclic prefix type of the fifth BWP, and a number and frequency domain position of resource blocks included in the fifth BWP, and the fifth BWP is any one BWP among the at least one BWP; and the processing unit 420 is further configured to: determine the second RNTI according to the second DCI after the receiving unit 410 receives the second DCI sent by the network device, wherein the indicator of the second BWP included in the second DCI is the intra-group number of the second BWP; and within a BWP group corresponding to the second RNTI, determine the second BWP according to the intra-group number of the second BWP.

Alternatively, the second configuration information is the RRC configuration information.

Alternatively, the second DCI includes a configuration parameter of the second BWP, wherein the configuration parameter includes at least one of the following parameters: a subcarrier spacing of the second BWP, a cyclic prefix type of the second BWP, a number and a frequency domain position of resource blocks included in the second BWP.

Alternatively, the receiving unit 410 is further configured to: receive third configuration information sent by the network device before receiving the second DCI sent by the network device; and the processing unit 420 is further configured to: according to the third configuration information, determine that the DCI scrambled by the second RNTI needs to be monitored.

Alternatively, the third configuration information is the RRC configuration information.

Alternatively, the first BWP and the second BWP are uplink BWPs, or, the first BWP and the second BWP are downlink BWPs.

It should be understood that the terminal device 400 according to the implementation of the present application may correspond to performing the method 200 in the implementation of the present application, and the above and other operations and/or functions of each unit in the terminal device 400 are respectively for implementing corresponding flow of the terminal device of each method in FIG. 1 to FIG. 8, and will not be repeated here for the sake of brevity.

Therefore, according to DCIs scrambled by two RNTIs activate one BWP respectively, the terminal device in the implementation of the present application enables the two BWPs are in the active state at the same time, which may support one terminal to simultaneously run different types of services based on two Numerologies, thereby effectively supporting the 5G terminal to simultaneously run the eMBB service and the URLLC service, and greatly improving the service richness and the service capability of the 5G terminal. Present implementation is mainly applicable to scenarios after a RRC connection is established.

Figure 10:
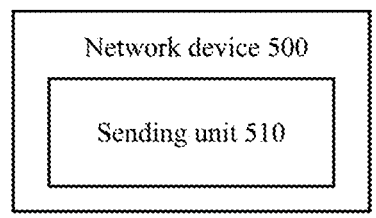
FIG. 10 is another schematic block diagram of a network device provided by an implementation of this application.

As shown in FIG. 10, a network device 500 according to an implementation of the present application includes: a sending unit 620. Specifically, the sending unit 510 is configured to: send second downlink control information (DCI) to a terminal device, wherein a first BWP of the terminal device is in an active state, the second DCI is scrambled by a second radio network temporary identifier (RNTI), the second DCI is used for indicating a second BWP, the first BWP is not activated by the second DCI, and the second DCI is used by the terminal device to maintain the active state of the first BWP and activate the second BWP.

Alternatively, the sending unit 510 is configured to: send first DCI to the terminal device before sending the second DCI to the terminal device, wherein the first DCI is scrambled by a first RNTI, the first RNTI is different from the second RNTI, the first DCI is used for indicating the first BWP, and the first DCI is used by the terminal device to activate the first BWP.

Alternatively, the first BWP is an initial active BWP, a first active BWP or a default BWP.

Alternatively, the sending unit 510 is further configured to: send third DCI to the terminal device, wherein the first BWP of the terminal device is in an active state, the third DCI is scrambled by the first RNTI, the first RNTI is different from the second RNTI, the third DCI is used for indicating the third BWP, and the third BWP is used by the terminal device to modify the active BWP from the first BWP to the third BWP.

Alternatively, the first RNTI is a C-RNTI.

Alternatively, the subcarrier spacings of the first BWP and the second BWP are different.

Alternatively, the second DCI includes an indicator of the second BWP.

Alternatively, the sending unit 510 is further configured to: send first configuration information to the terminal device before sending the second DCI to the terminal device, and the first configuration information is used for indicating a corresponding relationship between a configuration parameter of at least one BWP and an indicator of the at least one BWP, the at least one BWP includes the second BWP, a configuration parameter of a fourth BWP among the at least one BWP include at least one of following parameters: a subcarrier spacing of the fourth BWP, a cyclic prefix type of the fourth BWP, and a number and a frequency domain position of resource blocks included in the fourth BWP, and the fourth BWP is any one BWP among the at least one BWP.

Alternatively, the first configuration information is radio resource control RRC configuration information.

Alternatively, the sending unit 510 is further configured to send second configuration information to the terminal device before sending the second DCI to the terminal device, wherein the second configuration information includes at least one configuration sub-information, the configuration sub-information is used for indicating a corresponding relationship between a configuration parameters of at least one BWP included in a group of BWPs and an intra-group number of the at least one BWP, the group of BWPs corresponds to one RNTI, a configuration parameter of the fifth BWP among the at least one BWP includes: a subcarrier spacing of the fifth BWP, a cyclic prefix type of the fifth BWP, and a number and a frequency domain position of resource blocks included in the fifth BWP, the fifth BWP is any one BWP among the at least one BWP, an indicator of the second BWP included in the second DCI is the intra-group number of the second BWP, and the intra-group number of the second BWP is used by the terminal device to determine the second BWP within a BWP group corresponding to the second RNTI.

Alternatively, the second configuration information is RRC configuration information.

Alternatively, the second DCI includes a configuration parameter of the second BWP, wherein the configuration parameter includes at least one of following parameters: a subcarrier spacing of the second BWP, a cyclic prefix type of the second BWP, a number and a frequency domain position of resource blocks included in the second BWP.

Alternatively, the sending unit 510 is further configured to: send third configuration information to the terminal device before sending the second DCI to the terminal device, wherein the third configuration information is used for indicating that the terminal device needs to monitor the DCI scrambled by the second RNTI.

Alternatively, the third configuration information is RRC configuration information.

Alternatively, wherein the first BWP and the second BWP are uplink BWPs, or the first BWP and the second BWP are downlink BWPs.

It should be understood that the network device 500 according to the implementation of the present application may correspond to performing the method 300 in the implementation of the present application, and the above and other operations and/or functions of each unit in the network device 500 are respectively for implementing corresponding flow of the network device in the method in FIG. 1 to FIG. 8, and will not be repeated here for the sake of brevity.

Therefore, the network device in this implementation of the application sends DCIs scrambled by two RNTIs to the terminal device, respectively indicating to activate one BWP, so that two BWPs of the terminal device are in the active state at the same time, which may support one terminal to simultaneously run different types of services based on two Numerologies, thereby effectively supporting the 5G terminal to simultaneously run the eMBB service and the URLLC service, and greatly improving the service richness and service capability of the 5G terminal. This implementation is mainly applicable to scenarios after a RRC connection is established.

Figure 11:
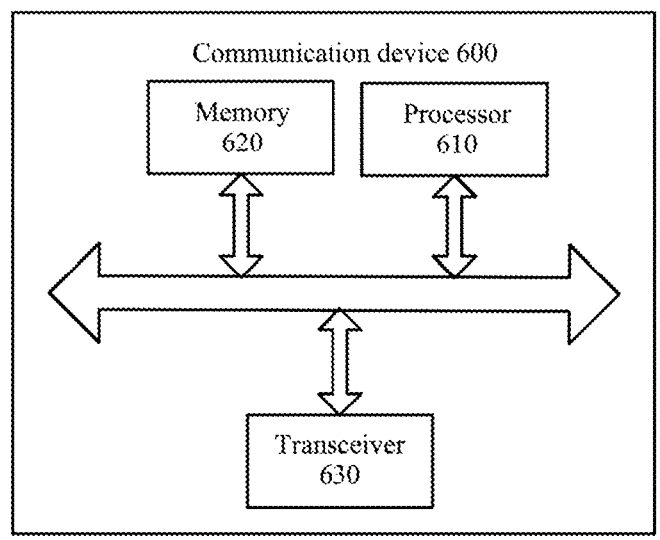
FIG. 11 is a schematic block diagram of a communication device provided by an implementation of the present application.

FIG. 11 is a schematic structure diagram of a communication device 600 according to an implementation of the present application. The communication device 600 shown in FIG. 11 includes a processor 610. The processor 610 may call and run a computer program from a memory to implement the method in the implementation of the present application.

Alternatively, as shown in FIG. 11, the communication device 600 may further include a memory 620. The processor 610 may call and run a computer program from the memory 620 to implement the method in the implementation of the present application.

The memory 620 may be a separate device independent of the processor 610 or may be integrated in the processor 610.

Alternatively, as shown in FIG. 11, the communication device 600 may further include a transceiver 630, and the processor 610 may control the transceiver 630 to communicate with other devices. Specifically, the transceiver 630 may send information or data to the other devices or receive information or data sent by the other devices.

The transceiver 630 may include a transmitter and a receiver. The transceiver 630 may further include an antenna, and a number of the antenna may be one or more.

Alternatively, the communication device 600 may be a network device of the implementation of the present application, and the communication device 600 may implement corresponding process implemented by the network device in various methods of the implementation of the present application, which will not be repeated here for brevity.

Alternatively, the communication device 600 may be specifically a mobile terminal/terminal device of the implementation of the present application, and the communication device 600 may implement corresponding process implemented by the mobile terminal/terminal device in the various methods of the implementation of the present application, which will not be repeated here for brevity.

Figure 12:
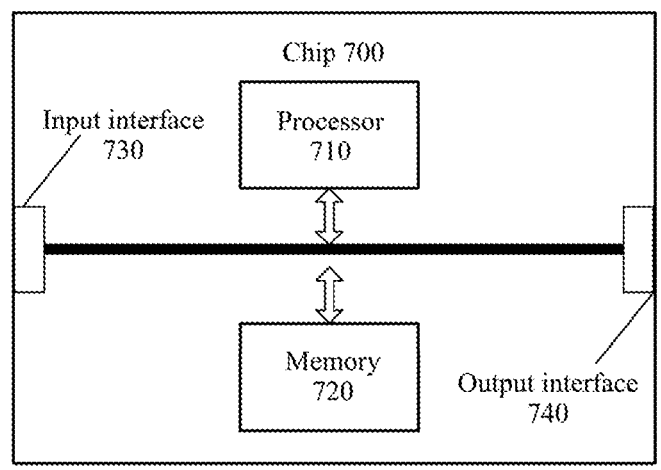
FIG. 12 is a schematic block diagram of a chip provided by an implementation of the present application.

FIG. 12 is a schematic structure diagram of a chip of an implementation of the present application. A chip 700 shown in FIG. 12 includes a processor 710. The processor 710 may call and run a computer program from a memory to implement the method in the implementation of the present application.

Alternatively, as shown in FIG. 12, the chip 700 may further include a memory 720. The processor 710 may call and run a computer program from the memory 720 to implement the method in the implementation of the present application.

The memory 720 may be a separate device independent of the processor 710 or may be integrated in the processor 710.

Alternatively, the chip 700 may further include an input interface 730. The processor 710 may control the input interface 730 to communicate with other devices or chips. Specifically, the input interface 730 may acquire information or data sent by the other devices or chips.

Alternatively, the chip 700 may further include an output interface 740. The processor 710 may control the output interface 740 to communicate with other devices or chips. Specifically, the output interface 740 may output information or data to the other devices or chips.

Alternatively, the chip may be applied in a network device of the implementation of the present application, and the chip may implement corresponding process implemented by the network device in various methods of the implementation of the present application, which will not be repeated here for brevity.

Alternatively, the chip may be applied in a mobile terminal/terminal device of the implementation of the present application, and the chip may implement corresponding process implemented by the mobile terminal/terminal device in the various methods of the implementation of the present application, which will not be repeated here for brevity.

It should be understood that the chip mentioned in the implementation of the present application may be referred to as a system-level chip, a system chip, a chip system or a system-on-chip, etc..

Figure 13:
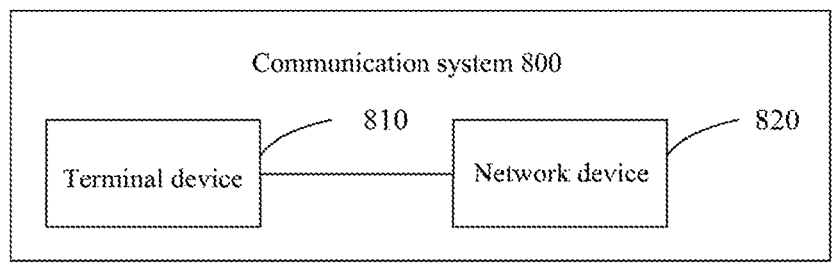
FIG. 13 is a schematic block diagram of a communication system provided by an implementation of the present application.

FIG. 13 is a schematic block diagram of a communication system 800 provided by an implementation of the present application. As shown in FIG. 13, the communication system 800 may include a terminal device 810 and a network device 820.

The terminal device 810 may be configured to implement corresponding functions implemented by the terminal device in the above method, and the network device 820 may be configured to implement corresponding functions implemented by the network device in the above method, which will not be repeated here for brevity.

It should be understood that, a processor in the implementation of the present application may be an integrated circuit chip having a signal processing capability. In an implementation process, various steps of the above method implementations may be implemented with a hardware integrated logic circuit in the processor or instructions in a form of software. Above processor may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, steps and logical block diagrams disclosed in this implementation of the present application. The general purpose processor may be a microprocessor, or the processor may be any conventional processor, or the like. The steps of the method disclosed in combination with the implementation of the present application may be directly embodied to be executed and completed by a hardware decoding processor, or executed and completed by a combination of hardware and software modules in the decoding processor. The software module may be located in a mature storage medium in present field, such as a random access memory, a flash memory, a read-only memory, a programmable read-only memory, an electrically erasable programmable memory, or a register. The storage medium is located in the memory, and the processor reads information in the memory and completes the steps of the above methods in combination with hardware of the processor.

It may be understood that, the memory in the implementation of the present application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external cache. Through exemplary but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described in present specification is intended to include but is not limited to these and any other suited type of memory.

It should be understood that, the above memory is illustrative not limiting description. For example, For example, the memory in the implementations of the present application also may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), or the like. That is, memories in the implementations of the present application are intended to include, but are not limited to, these and any other suitable types of memories.

An implementation of the present application further provides a computer readable storage medium, configured to store a computer program.

Alternatively, the computer readable storage medium may be applied in a network device of the implementation of the present application, and the computer program causes the computer to perform corresponding process implemented by the network device in various methods of the implementation of the present application, which will not be repeated here for brevity.

Alternatively, the computer readable storage medium may be applied in a mobile terminal/terminal device of the implementation of the present application, and the computer program causes the computer to perform the corresponding processes implemented by the mobile terminal/terminal device in various methods of the implementation of the present application, which will not be repeated here for brevity.

An implementation of the present application also provides a computer program product including computer program instructions.

Alternatively, the computer program product may be applied in a network device of the implementation of the present application, and the computer program instructions cause the computer to perform the corresponding processes implemented by the network device in various methods of the implementation of the present application, which will not be repeated here for brevity.

Alternatively, the computer program product may be applied in a mobile terminal/terminal device of the implementation of the present application, and the computer program instructions enable the computer to perform the corresponding processes implemented by the mobile terminal/terminal device in various methods according to the implementation of the present application, which will not be repeated here for brevity.

An implementation of the present application also provides a computer program.

Alternatively, the computer program may be applied in a network device of the implementation of the present application. When the computer program is run on a computer, the computer is caused to perform corresponding processes implemented by the network device in various methods of the implementation of the present application, which will not be repeated here for brevity.

Alternatively, the computer program may be applied in a mobile terminal/terminal device of the implementation of the present application. When the computer program is run on the computer, the computer is caused to perform the corresponding processes implemented by the mobile terminal/terminal device in various methods of the implementation of the present application, which will not be repeated here for brevity.

An ordinary skilled in the art may be aware that, in combination with units and algorithm steps of the examples described by the implementation disclosed in present specification, the present application may be implemented with electronic hardware or a combination of computer software and electronic hardware. Whether the functions are implemented with hardware or software depends on a particular application and a design constraint condition of the technical solution. A skilled in the art may use different methods for each particular application to implement the described functions, but the implementation should not be considered as to go beyond a scope of the present application.

A skilled in the art may clearly understand that, for convenience and brevity of the description, particular working processes of the above described system, apparatus, and unit may be referred to corresponding process in foregoing method implementations, which will not be repeated herein again.

In several implementations provided in the present application, it should be understood that the disclosed system, apparatus, and method may be implemented in other manners. For example, above described apparatus implementations are only illustrative, for example, division of units is only a logical function division, and there may be other division manners in actual implementation. For example, multiple units or components may be combined or integrated into another system, or some features may be ignored or not executed. In addition, displayed or discussed mutual couplings or direct couplings or communication connections may be through some interfaces. The indirect couplings or communication connections between the apparatuses or units may be in electronic, mechanical, or other forms.

Units described as separate components may or may not be physically separate, and parts displayed as units may or may not be physical units, that is, may be located in one position, or may be distributed on multiple network units. Some or all of the units may be selected based on actual requirements to implement a purpose of the solution of the implementations.

In addition, various functional units in various implementations of the present application may be integrated in one processing unit, or various units may be physically present separately, or two or more units may be integrated in one unit.

When the functions are implemented in the form of a software functional unit and sold or used as an independent product, the functions may be stored in a computer-readable storage medium. Based on such an understanding, the technical solution of the present application essentially, or a part contributing to the prior art, or a part of the technical solution may be embodied in a form of a software product. The computer software product is stored in a storage medium and includes several instructions for causing a computer device (which may be a personal computer, a server, a network device, or the like) to perform all or some of the steps of the methods described in various implementations of this application. The foregoing storage medium includes: any medium that may store program codes, such as a USB flash drive, a removable hard disk, a Read-Only Memory (ROM), a Random Access Memory (RAM), a magnetic disk, or an optical disc, and the like.

The above descriptions are merely specific implementations of the present application, but a protection scope of the present application is not limited to this. Any variation or replacement readily thought of by a skilled in the art within a technical scope disclosed in the present application shall fall within the protection scope of the present application. Therefore, the protection scope of the present application shall be subject to the protection scope of the claims.

What is claimed is:

1. A method for activating a bandwidth part (BWP), comprising:
receiving, by a terminal device, second downlink control information (DCI) sent by a network device, wherein a first BWP of the terminal device is in an active state, the second DCI is scrambled by a second radio network temporary identifier (RNTI), the second DCI is used for indicating a second BWP, and the first BWP is not activated by the second DCI; and maintaining, by the terminal device, the active state of the first BWP and activating the second BWR;

wherein the second DCI comprises an indicator of the second BWP;

wherein before receiving, by the terminal device, the second downlink control information (DCI) sent by the network device, further comprising:

receiving, by the terminal device, second configuration information sent by the network device, wherein the second configuration information comprises at least one configuration sub-information, the configuration sub-information is used for indicating a corresponding relationship between a configuration parameter of at least one BWP comprised in a group of BWPs and an intra-group number of the at least one BWP, the group of BWPs corresponds to one RNTI, a configuration parameter of a fifth BWP among the at least one BWP comprises: a subcarrier spacing of the fifth BWP, a cyclic prefix type of the fifth BWP, and a number and a frequency domain position of resource blocks comprised in the fifth BWP, wherein the fifth BWP is any one BWP among the at least one BWP;

after receiving, by the terminal device, the second downlink control information (DCI) sent by the network device, further comprising:

determining, by the terminal device, the second RNTI according to the second DCI, wherein the indicator of the second BWP comprised in the second DCI is an intra-group number of the second BWP; and determining, by the terminal device, the second BWP, within a BWP group corresponding to the second RNTI, according to the intra-group number of the second BWP.

2. The method of claim 1, before receiving, by the terminal device, the second downlink control information DCI sent by the network device, further comprising:

receiving, by the terminal device, a first DCI sent by the network device, wherein the first DCI is scrambled by a first RNTI, the first RNTI is different from the second RNTI, and the first DCI is used for indicating the first BWP; and activating, by the terminal device, the first BWP according to the first DCI.

3. The method of claim 2, further comprising:

receiving, by the terminal device, a third DCI sent by the network device, wherein the first BWP of the terminal device is in the active state, the third DCI is scrambled by the first RNTI, the first RNTI is different from the second RNTI, and the third DCI is used for indicating a third BWP; and modifying, by the terminal device, an active BWP from the first BWP to the third BWP.

4. A method for activating a bandwidth part (BWP), comprising:

sending, by a network device, second downlink control information (DCI) to a terminal device, wherein a first BWP of the terminal device is in an active state, the second DCI is scrambled by a second radio network temporary identifier (RNTI), the second DCI is used for indicating a second BWP, the first BWP is not activated by the second DCI, and the second DCI is used by the terminal device to maintain the active state of the first BWP and activate the second BWR;

wherein the second DCI comprises an indicator of the second BWP;

before sending, by the network device, the second DCI to the terminal device, further comprising:

sending, by the network device, second configuration information to the terminal device, wherein the second configuration information comprises at least one configuration sub-information, and the configuration sub-information is used for indicating a corresponding relationship between a configuration parameter of at least one BWP included in a group of BWPs and an intra-group number of the at least one BWP, and the group of BWPs corresponds to one RNTI, a configuration parameter of a fifth BWP among the at least one BWP comprises a subcarrier spacing of the fifth BWP, a cyclic prefix type of the fifth BWP, a number of resource blocks and frequency domain positions of the resource blocks included in the fifth BWP, wherein the fifth BWP is any one BWP of the at least one BWP, the indicator of the second BWP comprised in the second DCI is an intra-group number of the second BWP, and the intra-group number of the second BWP is used by the terminal device to determine the second BWP in a BWP group corresponding to the second RNTI.

5. The method of claim 4, before sending, by the network device, the second DCI to the terminal device, further comprising:

sending, by the network device, first DCI to the terminal device, wherein the first DCI is scrambled by a first RNTI, the first RNTI is different from the second RNTI, the first DCI is used for indicating the first BWP, and the first DCI is used by the terminal device to activate the first BWP.

6. The method of claim 5, further comprising:

sending, by the network device, third DCI to the terminal device, wherein the first BWP of the terminal device is in the active state, the third DCI is scrambled by the first RNTI, the first RNTI is different from the second RNTI, the third DCI is used for indicating a third BWP, and the third DCI is used by the terminal device to modify an active BWP from the first BWP to the third BWP.

7. The method of claim 4, wherein the first BWP is an initial active BWP, a first active BWP or a default BWP.

8. A terminal device, comprising:

a transceiver, configured to receive second downlink control information (DCI) sent by a network device, wherein a first BWP (bandwidth part) of the terminal device is in an active state, the second DCI is scrambled by a second radio network temporary identifier (RNTI), the second DCI is used for indicating a second BWP, and the first BWP is not activated by the second DCI; and a processor, configured to maintain the active state of the first BWP and activate the second BWR;

wherein the second DCI comprises an indicator of the second BWP;

wherein the transceiver is further configured to:

before receiving the second DCI sent by the network device, receive second configuration information sent by the network device, wherein the second configuration information comprises at least one configuration sub-information, the configuration sub-information is used for indicating a corresponding relationship between a configuration parameter of at least one BWP included in a group of BWPs and an intra-group number of the at least one BWP, the group of BWP corresponds to one RNTI, a configuration parameter of a fifth BWP among the at least one BWP comprises: a subcarrier spacing of the fifth BWP, a cyclic prefix type of the fifth BWP, a number of resource blocks and frequency domain positions of the resource blocks comprised in the fifth BWP, wherein the fifth BWP is any one BWP among the at least one BWP;

and the processor is further configured to:

after receiving, by the transceiver, the second DCI sent by the network device, determine the second RNTI according to the second DCI, wherein the indicator of the second BWP included in the second DCI is an intra-group number of the second BWP; and within a BWP group corresponding to the second RNTI, determine the second BWP according to the intra-group number of the second BWP.

9. The terminal device of claim 8, wherein the transceiver is further configured to:

before receiving the second DCI sent by the network device, receive a first DCI sent by the network device, wherein the first DCI is scrambled by a first RNTI, the first RNTI is different from the second RNTI, and the first DCI is used for indicating the first BWP;

and the processor is further configured to:

activate the first BWP according to the first DCI.

10. The terminal device of claim 9, wherein the transceiver is further configured to:

receive third DCI sent by the network device, wherein the first BWP of the terminal device is in the active state, the third DCI is scrambled by the first RNTI, the first RNTI is different from the second RNTI, and the third DCI is used for indicating a third BWP;

and the processor is further configured to:

modify the active BWP from the first BWP to the third BWP.

11. The terminal device of claim 10, wherein the first RNTI is a cell radio network temporary identifier (C-RNTI).

12. The terminal device of claim 8, wherein the first BWP is an initial active BWP, a first active BWP or a default BWP.

13. The terminal device of claim 8, wherein subcarrier spacings of the first BWP and the second BWP are different.

14. The terminal device of claim 8, wherein the transceiver is further configured to:

before receiving the second DCI sent by the network device, receive first configuration information sent by the network device, wherein the first configuration information is used for indicating a corresponding relationship between a configuration parameter of at least one BWP and an indicator of the at least one BWP, the at least one BWP comprises the second BWP, a configuration parameter of a fourth BWP among the at least one BWP comprises at least one of following parameters: a subcarrier spacing of the fourth BWP, a cyclic prefix type of the fourth BWP, a number of resource blocks and frequency domain positions of the resource blocks included in the fourth BWP, wherein the fourth BWP is any one BWP of the at least one BWP.

15. The terminal device of claim 14, wherein the first configuration information is radio resource control (RRC) configuration information.

16. The terminal device of claim 8, wherein the second configuration information is RRC configuration information.

17. The terminal device of claim 8, wherein the second DCI comprises a configuration parameter of the second BWP, and the configuration parameter comprises at least one of following parameters: a subcarrier spacing of the second BWP, a cyclic prefix type of the second BWP, a number of resource blocks and frequency domain positions of the resource blocks comprised in the second BWP.

18. The terminal device of claim 8, wherein the transceiver is further configured to:

before receiving the second DCI sent by the network device, receive third configuration information sent by the network device;

and the processor is further configured to:

according to the third configuration information, determine that a DCI scrambled by the second RNTI needs to be monitored.

19. The terminal device of claim 18, wherein the third configuration information is RRC configuration information.

20. The terminal device of claim 8, wherein the first BWP and the second BWP are uplink BWP, or the first BWP and the second BWP are downlink BWPs.

21. A network device, comprising:

a transceiver, configured to send second downlink control information (DCI) to a terminal device, wherein a first BWP (bandwidth part) of the terminal device is in an active state, the second DCI is scrambled by a second radio network temporary identifier (RNTI), the second DCI is used for indicating a second BWP, the first BWP is not activated by the second DCI, and the second DCI is used by the terminal device to maintain the active state of the first BWP and activate the second BWR;

wherein the second DCI comprises an indicator of the second BWP;

wherein the transceiver is further configured to:

before sending the second DCI to the terminal device, send second configuration information to the terminal device, wherein the second configuration information comprises at least one configuration sub-information, the configuration sub-information is used for indicating a corresponding relationship between a configuration parameter of at least one BWP comprised in a group of BWPs and an intra-group number of the at least one BWP, the group of BWPs corresponds to one RNTI, a configuration parameter of a fifth BWP among the at least one BWP comprises: a subcarrier spacing of the fifth BWP, a cyclic prefix type of the fifth BWP, a number of resource blocks and frequency domain positions of the resource blocks included in the fifth BWP, wherein the fifth BWP is any one BWP of the at least one BWP, the indicator of the second BWP comprised in the second DCI is an intra-group number of the second BWP, and the intra-group number of the second BWP is used by the terminal device to determine the second BWP within a BWP group corresponding to the second RNTI.

22. The network device of claim 21, wherein the transceiver is further configured to:

before sending the second DCI to the terminal device, send first DCI to the terminal device, wherein the first DCI is scrambled by a first RNTI, the first RNTI is different from the second RNTI, the first DCI is used for indicating the first BWP, and the first DCI is used by the terminal device to activate the first BWP.

23. The network device of claim 22, wherein the transceiver is further configured to:

send third DCI to the terminal device, wherein the first BWP of the terminal device is in the active state, the third DCI is scrambled by the first RNTI, the first RNTI is different from the second RNTI, the third DCI is used for indicating a third BWP, and the third DCI is used by the terminal device to modify the active BWP from the first BWP to the third BWP.

24. The network device of claim 21, wherein the transceiver is further configured to:
before sending the second DCI to the terminal device, send first configuration information to the terminal device, wherein the first configuration information is used for indicating a corresponding relationship between a configuration parameter of at least one BWP and an indicator of the at least one BWP, the at least one BWP comprises the second BWP, a configuration parameter of a fourth BWP among the at least one BWP comprises at least one of following parameters: a subcarrier spacing of the fourth BWP, a cyclic prefix type of the fourth BWP, a number of resource blocks and frequency domain positions of the resource blocks included in the fourth BWP, wherein the fourth BWP is any one BWP of the at least one BWP.

25. The network device of claim 21, wherein the second DCI comprises a configuration parameter of the second BWP, and the configuration parameter comprises at least one of following parameters: a subcarrier spacing of the second BWP, a cyclic prefix type of the second BWP, a number of resource blocks and frequency domain positions of the resource blocks comprised in the second BWP.

26. The network device of claim 21, wherein the transceiver is further configured to:
before sending the second DCI to the terminal device, send third configuration information to the terminal device, wherein the third configuration information is used for indicating that the terminal device needs to monitor a DCI scrambled by the second RNTI.

* * * * *